Nov. 7, 1961   C. L. EKSERGIAN   3,007,552
HITCH-ACTUATED TRAILER BRAKES
Filed July 1, 1959   2 Sheets-Sheet 1
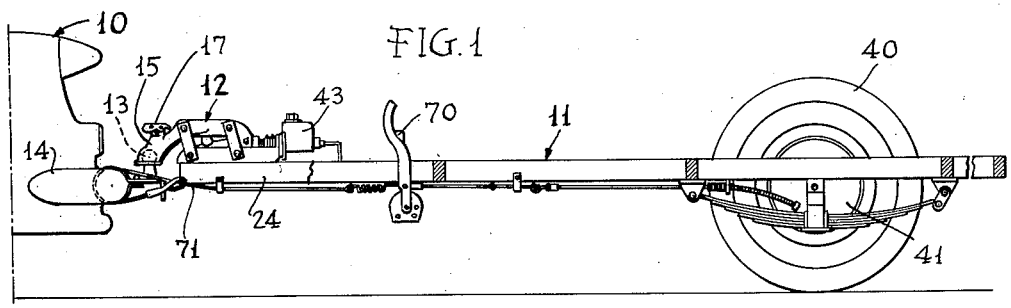
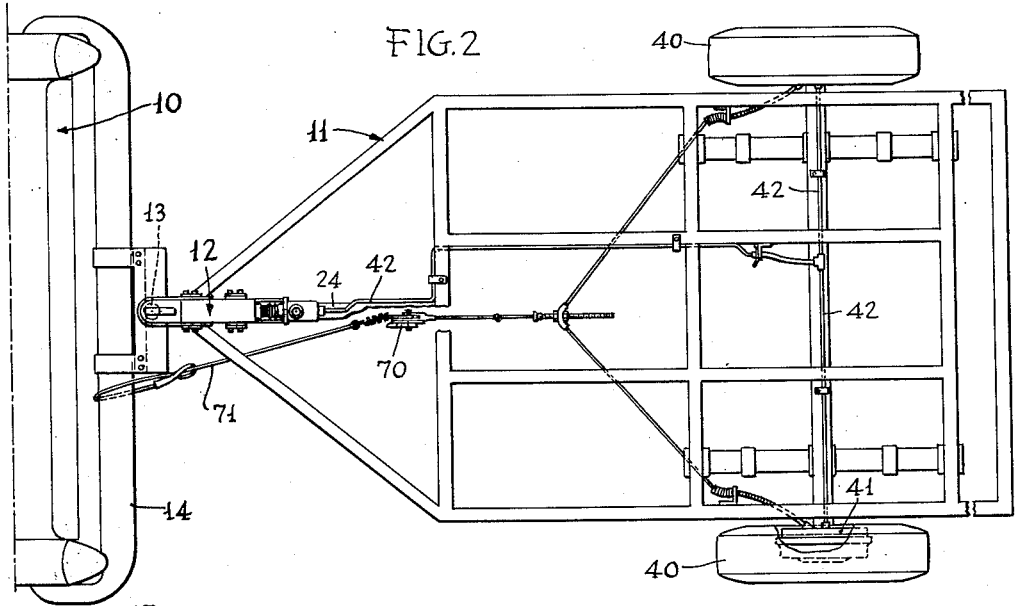
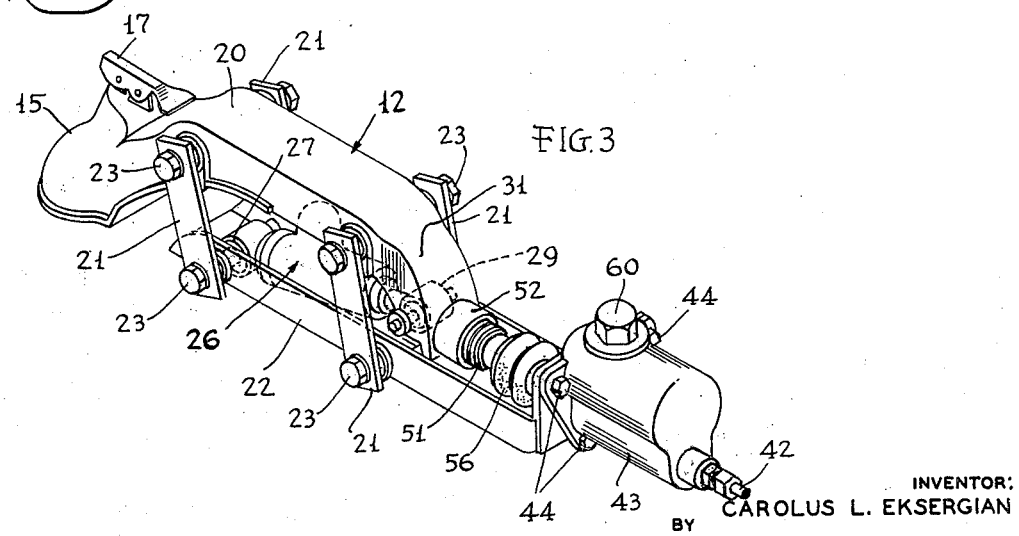
INVENTOR:
CAROLUS L. EKSERGIAN
BY
Wm. R. Glisson
ATTORNEY Nov. 7, 1961  C. L. EKSERGIAN  3,007,552
HITCH-ACTUATED TRAILER BRAKES
Filed July 1, 1959  2 Sheets-Sheet 2
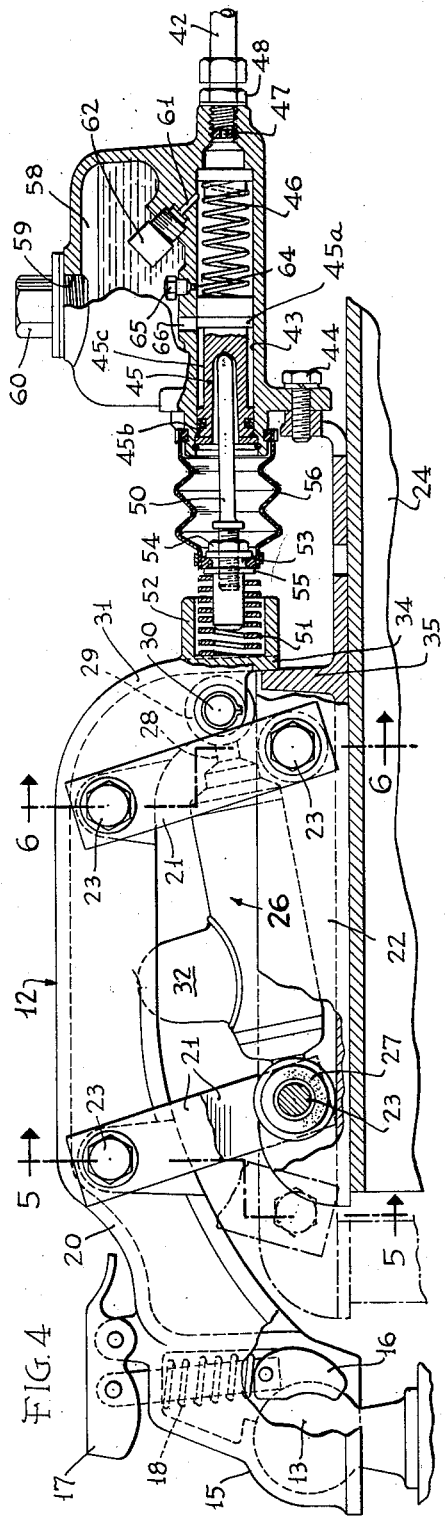
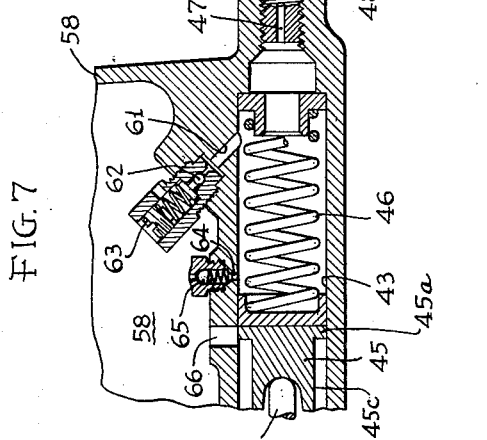
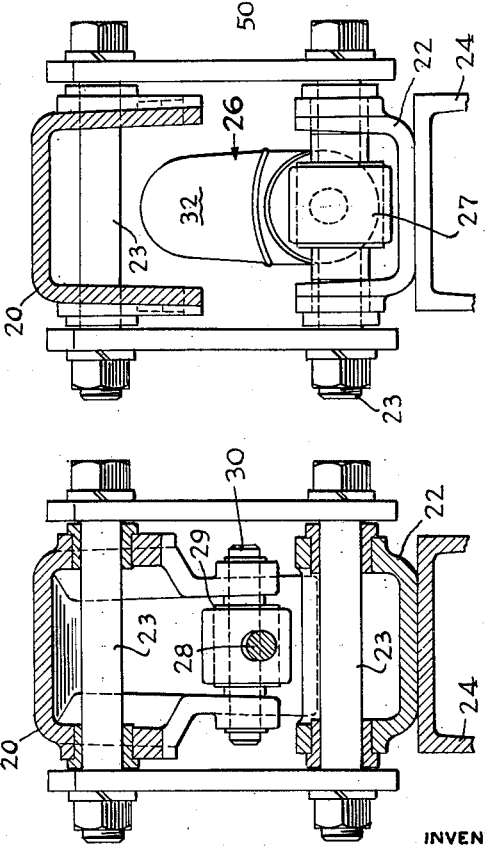
INVENTOR:
CAROLUS L. EKSERGIAN
BY
Wm. R. Glisson
ATTORNEY

United States Patent Office 3,007,552
Patented Nov. 7, 1961

3,007,552
HITCH-ACTUATED TRAILER BRAKES
Carolus L. Eksergian, Detroit, Mich., assignor to The Budd Company, Philadelphia, Pa., a corporation of Pennsylvania
Filed July 1, 1959, Ser. No. 824,268
1 Claim. (Cl. 188—112)

This invention relates to hitch-actuated trailer brakes and has for an object the provision of improvements in this art.

One of the particular objects is to provide means for effectively inhibiting hunting in the operation of the trailer brakes. By "hunting" is meant the undesired intermittent application and release of the trailer brakes due to the uneven forward movement of the trailer caused by road irregularities. This hunting type of trailer brake application has a disagreeable effect which is felt in the towing vehicle. What is desired is to have the trailer brakes applied only when there is an intentional sustained deceleration of the towing vehicle due to braking.

Another object is to provide a towing connection which employs swinging instead of sliding movement between relatively movable parts moving with the towing and towed vehicles respectively.

Another object is to provide a hitch connection which is very sturdy and resistant to injury, deformation, and binding due to unusual loads which may be applied in various directions transversely of the longitudinal towing axis of the hitch.

Another object is to provide a swingable hitch connection which houses, connects, and protects a shock absorber or buffer arranged in the line of action of the hitch.

Another object is to provide an anti-hunting spring directly in the line of movement between the towing vehicle and the master brake cylinder of the towed vehicle where it will effectively cause the shock absorber to go into operation before the brakes are applied, specifically the spring being interposed between one end of the shock absorber and the piston rod of the master cylinder.

The above and other objects and advantages of the invention will be apparent from the following description of an exemplary embodiment, reference being made to the accompanying drawings, wherein:

FIG. 1 is a side elevation of a towing and a towed vehicle with the improved brake-operating hitch connecting them;

FIG. 2 is a top plan view of the assembly shown in FIG. 1;

FIG. 3 is an isometric side elevation of the hitch assembly alone;

FIG. 4 is a side elevation and vertical section of the hitch assembly;

FIG. 5 is a vertical transverse section taken on the line 5—5 of FIG. 4;

FIG. 6 is a vertical transverse section on the line 6—6 of FIG. 4; and

FIG. 7 is an enlarged section of parts shown at the right side of FIG. 4 but in part on a different plane.

As shown in the drawings, a towing vehicle 10 is operatively connected to a towed vehicle or trailer 11 by a hitch which is generally referred to by the numeral 12.

The towing vehicle is provided with a coupling element, which is here shown as an upstanding ball 13 carried by the rear bumper or a frame extension 14, and the towed vehicle is provided with a mating cupped cap 15 which is held on the ball by a latch 16 operated by a lever 17 and held down by a spring 18. This coupling unit is a common commercial item.

The cupped cap 15 is a part of the hitch 12 and is carried by (formed integral with as shown) an upper hitch member 20 which is operatively connected, as by swinging links 21, to a lower hitch member 22. Pivot pins 23 connect the links to the hitch members 20, 22 so that the assembly forms a pantograph or parallelogram in which the members 20 and 22 are kept parallel in all positions of their movement. The lower hitch member is secured in any suitable way, as by bolts, welds or other means, to the draw frame or tongue 24 of the trailer 11.

The hitch members 20 and 22 are formed as deep channels with their open sides facing each other, together forming a strong box-like housing. Since the links 21 are widely spaced apart the hitch housing is very strong and rigid and resists disalignment and binding even when heavy lateral loads are applied to the hitch in use. The swinging connection provides the required relative movement between the hitch parts with the least possible friction and noise. Herein, nylon or other noise and wear suppressing bushings are provided at the joints of the pivot pins 23.

Relative longitudinal movement between the hitch members 20 and 22 in either direction is resisted by a shock absorber, buffer, or damper 26 of the cylinder-piston type having controlled leakage past a medial moving piston in the cylinder. One of the shock absorber elements, as the cylinder, is pivotally connected, as at the nylon-bushed joint 27, to the lower hitch member along the axis of the lower pivot pin axis, and the other shock absorber part, as the piston rod 28, is pivotally connected, as at the nylon-bushed joint 29, to a pivot pin 30 carried by the downwardly extending rear end projection 31 of the upper hitch member 20. The shock absorber has a surplus fluid dome 32 which assures that the operating cylinder is always kept full of fluid, usually oil. The shock absorber is of a known type and need not be specifically illustrated or described.

The forward end of the upper hitch member 20 is inclined downwardly to place the coupling cap center near the level of the lower hitch member 22 and this arrangement greatly reduces the lateral loads on the hitch.

The forward movement of the upper hitch member 20 relative to the lower hitch member 22 is limited by a stop 34 carried by the downwardly extending projection 31 which engages a fixed stop member or element 35 carried by the lower hitch member 22.

The wheels 40 of the trailer 11 are provided with brake drums 41 served by the usual type of hydraulic brakes normally used on passenger automobiles. It is not necessary to show these brakes which are served by a pressure fluid line 42 extending from a master cylinder 43 secured to the trailer-carrier hitch member 22, as by bolts 44.

Within the master cylinder 43 there operates a piston 45 opposed by a coil spring 46. Fluid flows out through are stricted orifice 47 in an end head cap 48, the size of the orifice being adjustable if desired.

The piston 45 is pushed rearwardly to force fluid to the brakes by a push rod 50 operated through a cushion spring 51 by the upper hitch member 20. Specifically, the spring 51 is seated in a socket flange 52 formed on the rear end of the depending projection 31 with the axis of the socket and spring directed to pass through the axis of the pivot pin 30 of the shock absorber connection. The forward end of the push rod 50 carries an enlarged end fitting 53 threaded thereon and held in adjusted position by a lock nut 54, the reduced end of the fitting 53 entering the inner space of the spring 51 and the rear end of the spring engaging the head flange 55 of the fitting. A dust excluding bellows 56 is secured between the head flange 55 and the forwardly protruding end of the master cylinder.

A reservoir 58 is located above the master cylinder and a fill opening 59 closed by a cap 60 is provided at the top of the reservoir. A return passage 61 leads from the rear end of the master cylinder into the reservoir and a check pressure limiting valve 62 is mounted in the upper end of this passage. An adjusting screw 63 of the relief valve is accessible from the large top filling opening. A passage 64 disposed forwardly in the master cylinder is exposed when the piston is fully forward and a downwardly opening check valve 65 in the passage allows fluid to run from the reservoir to the master cylinder to keep it full.

The piston 45 has a forward head 45a and a rear head 45b with an annular depression or groove 45c between the heads. The upper wall of the cylinder 43 has an opening 66 to allow fluid from the reservoir 58 to flow down and fill the space 45c of the piston.

In operation the pull is borne by the elements 34 and 35. When the brakes of the towing vehicle 10 are applied the trailer 11 moves forward by inertia. The hitch member 22 moves forward relative to member 21 and the movement is resisted by the shock absorber 26. Spring 51 is compressed and if the movement is small the piston 45 is not operated. Thus for small relative movements between the towing vehicle and trailer there is no false operation or hunting of the trailer brake. If the relative longitudinal movement is greater the spring 51 will move the piston rearwardly to force fluid into the line 42 to the brakes. However, the small orifice 47 will restrict the flow of fluid and prevent excessive application of the brakes such as would unduly retard the trailer and cause hunting.

If the pressure is very great, as when the trailer comes against an obstruction in backing up, the relief valve 62 will open and relieve the brake pressure to prevent damage.

The action of the spring 51 and the orifice 47 causes the shock absorber to perform its function properly.

A hand brake lever 70 is provided for the brakes and this is operated by hand for parking. A breakaway cable 71 is connected to the towing vehicle to operate the brakes in case the hitch should separate.

It is thus seen that the invention provides a simple, dependable, rugged and durable trailer hitch which provides an improved smooth action.

While one embodiment of the invention has been described for purposes of illustration, it is to be understood that there may be other embodiments and modifications within the general scope of the invention.

What is claimed is:

Hitch-actuated trailer brakes, comprising in combination, a towing vehicle or tractor having a disconnectible coupling element at its rear end, a first hitch member of channel section shape with the open side down and having a front downturned end carrying a coupling element mating with and connected to the coupling element of the tractor, a towed vehicle or trailer having hydraulic brakes adapted to be operated by relative forward movement of the trailer with respect to the tractor, the trailer having a tow frame or tongue at its forward end, a second channel-section shaped hitch member secured to said tongue with its open side disposed upwardly to face the open side of said first hitch member, longitudinally and transversely spaced parallel links pivoted at their ends to the outer sides of said channel-shaped hitch members, said first hitch member having a downwardly extending projection at its rear end, a cylinder-piston type shock absorber operatively mounted within the housing formed by said hitch members and their connecting links, said shock absorber having one end pivotally connected to the front end of said second hitch member and having its other end connected to said downwardly extending projection at a point intermediate said hitch members, said second hitch member having an upturned projection at its rear end, a master brake cylinder secured to said upturned projection and having a hydraulic fluid line connection with said brakes, a piston operatively mounted in said cylinder, a push rod socketed in the forward end of the piston, a head member adjustably carried on the front end of said push rod, a spring mounted on the front end of said head member, and a socket carried on the rear side of said downwardly extending projection of the first hitch member carrying said spring.

References Cited in the file of this patent

UNITED STATES PATENTS

| | | |
|---|---|---|
| 1,386,559 | Fegely | Aug. 2, 1921 |
| 2,070,481 | Gullikson | Feb. 9, 1937 |
| 2,082,398 | Hughes | June 1, 1937 |
| 2,152,017 | Banning | Mar. 28, 1939 |
| 2,320,585 | Gill et al. | June 1, 1943 |
| 2,354,268 | McNamara | July 25, 1944 |
| 2,391,603 | Wagner | Dec. 25, 1945 |
| 2,407,156 | Horne | Sept. 3, 1946 |
| 2,625,243 | Jones et al. | Jan. 13, 1953 |
| 2,642,961 | Teal | June 23, 1953 |
| 2,662,616 | De Lateur | Dec. 15, 1953 |
| 2,779,443 | Tucker | Jan. 29, 1957 |
| 2,834,436 | Davids | May 13, 1958 |
| 2,834,437 | Davids | May 13, 1958 |
| 2,846,030 | Wade | Aug. 5, 1958 |
| 2,936,048 | Love | May 10, 1960 |
| 2,954,104 | Shumate | Sept. 27, 1960 |

FOREIGN PATENTS

| | | |
|---|---|---|
| 876,216 | Germany | May 11, 1953 |